(12) United States Patent
Sameer

(10) Patent No.: US 11,854,257 B2
(45) Date of Patent: Dec. 26, 2023

(54) IDENTIFYING CANOPIES

(71) Applicant: HERE Global B.V., Eindhoven (NL)

(72) Inventor: Priyank Sameer, Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 283 days.

(21) Appl. No.: 17/323,698

(22) Filed: May 18, 2021

(65) Prior Publication Data

US 2022/0374634 A1    Nov. 24, 2022

(51) Int. Cl.
| | | |
|---|---|---|
| *G06V 20/10* | (2022.01) | |
| *G06T 7/12* | (2017.01) | |
| *G06F 16/29* | (2019.01) | |
| *G06T 7/13* | (2017.01) | |
| *G06V 10/60* | (2022.01) | |

(52) U.S. Cl.
CPC ............ *G06V 20/176* (2022.01); *G06F 16/29* (2019.01); *G06T 7/12* (2017.01); *G06T 7/13* (2017.01); *G06V 10/60* (2022.01); *G06T 2207/10032* (2013.01); *G06T 2207/30184* (2013.01)

(58) Field of Classification Search
CPC .......... G06T 2207/10032; G06T 7/507; G06V 20/176; G06V 20/13; G06V 20/17
See application file for complete search history.

(56) References Cited

U.S. PATENT DOCUMENTS

| | | | | |
|---|---|---|---|---|
| 2013/0322702 | A1* | 12/2013 | Piemonte | G06T 19/20 |
| | | | | 382/113 |
| 2014/0280269 | A1* | 9/2014 | Schultz | G06F 16/29 |
| | | | | 707/758 |
| 2016/0307363 | A1* | 10/2016 | Zou | G06T 15/005 |

FOREIGN PATENT DOCUMENTS

| | | | | |
|---|---|---|---|---|
| WO | 2014165787 A1 | 10/2014 | | |
| WO | WO-2014165787 A1 * | 10/2014 | ........... | G06T 7/0083 |
| WO | WO-2023040712 A1 * | 3/2023 | | |

OTHER PUBLICATIONS

Ngo, "Shadow/Vegetation and Building Detection from Single Optical Remote Sensing Image", Jun. 16, 2016, retrieved from https://tel.archives-ouvertes.fr/tel-01332681/document, 146 pages.

(Continued)

*Primary Examiner* — Guillermo M Rivera-Martinez

(57) ABSTRACT

Methods, apparatus and computer program for identifying canopy structures are provided. In one aspect, a method includes receiving a first calculated offset between a start point of a shadow cast by a building and a proximate first vertex of a building footprint of the building, and receiving a second calculated offset between an end point of the shadow cast by the building and a proximate second vertex of the building footprint, the shadow identified from an overhead image of the building, and wherein the building footprint comprises a shadowed side and a non-shadowed side, each running between the start point and the end point of the shadow on a different respective side of the building. The method also includes comparing the offsets to an offset threshold, and in response to both the first and second received offsets exceeding the offset threshold, determining that the building footprint represents a canopy.

20 Claims, 11 Drawing Sheets

(56) References Cited

OTHER PUBLICATIONS

Ok, "Automated Detection of Buildings from Single VHR Multispectral Images Using Shadow Information and Graph Cuts", ISPRS Journal of Photogrammetry and Remote Sensing, vol. 86, Dec. 2013, pp. 21-40.

Echeverría et al., "Detection and Segmentation of Vine Canopy in Ultra-High Spatial Resolution RGB Imagery Obtained from Unmanned Aerial Vehicle (UAV): A Case Study in a Commercial Vineyard", Mar. 15, 2017, 14 pages.

Jiao et al., "Individual Building Rooftop and Tree Crown Segmentation from High-Resolution Urban Aerial Optical Images", Research Article, Published Mar. 2, 2016, pages.

* cited by examiner

IDENTIFYING CANOPIES

TECHNICAL FIELD

The present application relates to methods, apparatus and computer program products for identifying canopy structures. In particular, the present application relates to using the shadows cast by buildings and visible in overhead images to identify buildings as canopy structures.

BACKGROUND

Canopies are a sub-group of buildings. Currently, there are methods for differentiating canopies from other types of building, for example by manual inspection of street level images. However, there is still room for improvement in the field of canopy identification.

The listing or discussion of a prior-published document or any background in this specification should not necessarily be taken as an acknowledgement that the document or background is part of the state of the art or is common general knowledge.

SUMMARY

According to a first aspect, there is provided a computer-implemented method comprising: receiving a first calculated offset between a start point of a shadow cast by a building and a proximate first vertex of a building footprint of the building, receiving a second calculated offset between an end point of the shadow cast by the building and a proximate second vertex of the building footprint, the shadow having been identified from an overhead image of the building, and wherein the building footprint comprises a shadowed side and a non-shadowed side, each running between the start point and the end point of the shadow on a different respective side of the building; compare the first and second received offsets to an offset threshold; and in response to both the first and second received offsets exceeding the offset threshold, determining that the building footprint represents a canopy.

The offset threshold corresponds to at least one or more of 0.25 meters, 0.5 meters, 1 meter, 1.5 meters, 2 meters or 2.5 meters at a real-world scale. These values correspond to distances in the real-world. The term 'at least' should be read in the sense of 'equal to or higher than', in this and the following paragraph.

The offset threshold may be a fraction of a length of an edge of the building footprint along which the offset occurs. The fraction may be expressed as a fraction, a percentage, a ratio or a decimal. The offset threshold may be at least one or more of 2%, 5%, 10%, 15% and 20% (or equivalent expressions).

The overhead image of the building may be a satellite image. The overhead image may be an image captured by an unmanned aerial vehicle or a manned aerial vehicle.

The method may further comprise identifying the shadow from the overhead image of the building.

The method may further comprise identifying the start point of the shadow and the end point of the shadow. The start point and end point may be identified from the shadow by determining two points along its perimeter at which the building footprint, shadow and un-shadowed-ground all intersect. The start point and end point may be identified by determining two corners of the shadow which are in contact with the building footprint. The start and end points may be identified by determining two points at which an edge of the building footprint intersects with a part of the shadow perimeter that is substantially perpendicular to the edge of the building footprint.

The method may comprise identifying the start point and end point of the shadow from more than two candidate start/end points. The two points resulting in the largest offsets to a proximate vertex may be chosen. The start point and end point which minimise the amount of unshadowed region on the shadowed side of the building footprint and/or minimise the amount of shadowed region on the unshadowed side of the building footprint may be chosen. Candidate points which are next to long stretches of shadowed building footprint and/or long stretches of unshadowed building footprint may be prioritised over candidate points which are next to short stretches of shadowed building footprint and/or unshadowed building footprint.

The method may further comprise, for each of the start point and end point of the shadow, identifying a proximate vertex of the building footprint. A proximate vertex may be identified by determining the vertex of the canopy footprint that is nearest to the start point or end point of the shadow. One or more checks may be performed on the nearest vertex to avoid identification of an erroneous proximate vertex.

The building footprint may be stored in a building layer of a geographic database.

The method may further comprise: calculating the first offset between the start point of a shadow cast by a building and the proximate first vertex of the building footprint, and calculating the second offset between the end point of the shadow cast by the building and the proximate second vertex of the building footprint.

Calculating each offset may involve taking a measurement of an offset distance from the building footprint, the overhead image and/or the shadow. The measured distance may be combined with a known scale to obtain an absolute real-world offset distance. The measured distance can be combined with a similar measurement for the length of an edge of the building footprint along which the offset occurs in order to obtain a relative distance offset.

The method may further comprise aligning the building footprint and shadow prior to calculating the first and second offsets. The building footprint and shadow may be aligned by aligning the boundary lines at which the building footprint and shadow meet.

The shadow may be a continuous shadow with no breaks in the shadow between the start point and end point. The shadow may be a discontinuous shadow comprising two or more shadow portions with one or more non-shadowed portions in between on the shadowed side of the building footprint A vertex of the building footprint may be a point at which two edges of the building footprint meet.

At least one of the first vertex and second vertex of the building footprint may be a point at which the building footprint and an end of a chord of the building footprint meet, the chord being orientated to maximise the component of the chord in a direction that is perpendicular to the direction of the light source. Both the first vertex and second vertex may be points at which the building footprint and an end of the chord of the building footprint meet.

The method may further comprise updating a geographic database to indicate that the building is a canopy. Updating a geographic database may comprise inserting a new geographic record and/or modifying an existing geographic record.

The method may further comprise determining that the building footprint represents a full canopy, in response to both the first and second received offsets exceeding the offset threshold.

The method may further comprise, if neither the first or second received offsets exceed the offset threshold, determining that the building footprint does not represent a canopy.

The method may further comprise, if only one of the first and second received offsets exceeds the threshold, determining that the building footprint does not represent a canopy.

The method may comprise, if only one of the first and second received offsets exceeds the threshold, determining that the building footprint could potentially represent a canopy but that further investigation of the image, shadow and/or building footprint is required before the building is classified.

The steps of any method disclosed herein do not have to be performed in the exact order disclosed, unless explicitly stated or understood by the skilled person.

According to a second aspect, there is provided an apparatus comprising at least one processor and at least one memory including computer program code, the at least one memory and the computer program code configured to, with the at least one processor, cause the apparatus to: receive a first calculated offset between a start point of a shadow cast by a building and a proximate first vertex of a building footprint of the building; receive a second calculated offset between an end point of the shadow cast by the building and a proximate second vertex of the building footprint, the shadow having been identified from an overhead image of the building, and wherein the building footprint comprises a shadowed side and a non-shadowed side, each running between the start point and the end point of the shadow on a different respective side of the building; compare the first and second received offsets to an offset threshold; and in response to both the first and second received offsets exceeding the offset threshold, determine that the building footprint represents a canopy.

The apparatus may be further caused to perform each of the method steps discussed above in relation to the first aspect. The apparatus may be caused to perform one or more steps of the methods disclosed elsewhere in the present disclosure.

Corresponding computer programs for implementing one or more steps of the methods disclosed herein are also within the present disclosure and are encompassed by one or more of the described examples.

For example, in a third aspect there is provided a computer program comprising instructions which, when the program is executed by a computer, cause the computer to: receive a first calculated offset between a start point of a shadow cast by a building and a proximate first vertex of a building footprint of the building; receive a second calculated offset between an end point of the shadow cast by the building and a proximate second vertex of the building footprint, the shadow having been identified from an overhead image of the building, and wherein the building footprint comprises a shadowed side and a non-shadowed side, each running between the start point and the end point of the shadow on a different respective side of the building; compare the first and second received offsets to an offset threshold; and in response to both the first and second received offsets exceeding the offset threshold, determine that the building footprint represents a canopy.

One or more of the computer programs may, when run on a computer, cause the computer to configure any apparatus, including a battery, circuit, controller, or device disclosed herein or perform any method disclosed herein. One or more of the computer programs may be software implementations, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

One or more of the computer programs may be provided on a computer readable storage medium, which may be a physical computer readable storage medium such as a disc or a memory device, may be a non-transitory storage medium, or may be embodied as a transient signal. Such a transient signal may be a network download, including an internet download.

For example, in a fourth aspect, there is provided a computer-readable storage medium comprising instructions which, when executed by a computer, cause the computer to: receive a first calculated offset between a start point of a shadow cast by a building and a proximate first vertex of a building footprint of the building; receive a second calculated offset between an end point of the shadow cast by the building and a proximate second vertex of the building footprint, the shadow having been identified from an overhead image of the building, and wherein the building footprint comprises a shadowed side and a non-shadowed side, each running between the start point and the end point of the shadow on a different respective side of the building; compare the first and second received offsets to an offset threshold; and in response to both the first and second received offsets exceeding the offset threshold, determine that the building footprint represents a canopy.

The present disclosure includes one or more corresponding aspects, examples or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

Some example embodiments will now be described with reference to the accompanying drawings, in which:

FIG. 4b shows a plan view of the non-canopy building and shadow in FIG. 4a;

FIG. 4d shows the same perspective view of the non-canopy building and shadow as FIG. 4a;

FIG. 5b shows a plan view of the canopy and shadow of FIG. 5a;

DETAILED DESCRIPTION

Figure 1:
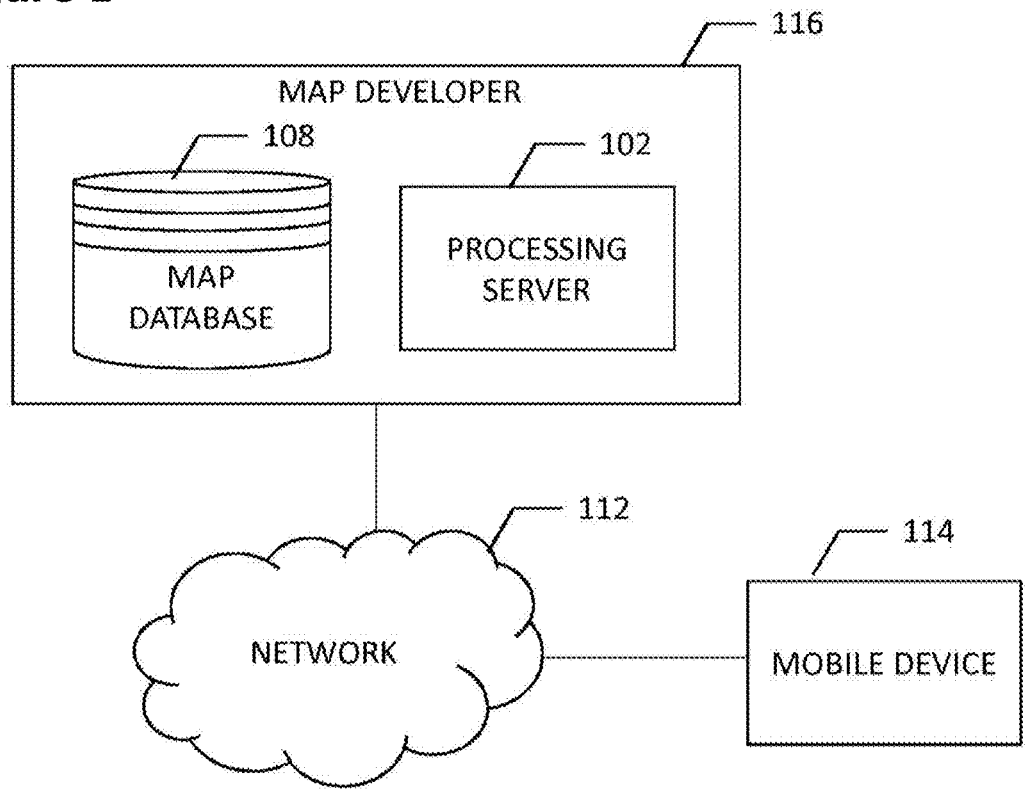
FIG. 1 shows a system according to one embodiment of the present disclosure.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Where applicable, like reference numerals refer to like elements.

Geographic databases (for example geographic databases for use for navigation) often contain representations of buildings such as houses, apartment blocks, offices, retail buildings and other commercial buildings. The database may indicate that specific locations or buildings are associated with a particular entity (e.g. that a particular building is Apartment Block A, the office of Company B or a retail location of Company C), Buildings are typically not labelled or categorised by type of building in these geographic databases. This may be because it is difficult, time-consuming and resource-intensive to obtain accurate and reliable information which allows all buildings to be labelled or categorised by type. For example, a retailer may provide information about retail-type buildings that they own or operate, but this information can only be used to categorise a small number of buildings. A vendor may collect building type information by manually surveying the buildings, and provide this information to a geographic database proprietor. Again, this information can only be used to categorise a small number of buildings. Land registries give information about building addresses and ownership, but the type of building cannot be reliably deduced.

One type of building which is difficult to identify is canopies. One current method for identifying canopies is to manually inspect street level imagery (i.e. images collected from street level rather than from overhead). Another method combines street level imagery with light detection and ranging (LIDAR) data.

The present disclosure relates to methods, apparatus, and computer program products for identifying canopy structures from overhead images of buildings, using the shadows cast by buildings as identified from the overhead images.

The sections of the description below discuss canopy structures, the differences between the shadows cast by canopies and non-canopy buildings, method steps for identifying canopy structures, and examples of canopies having various shape characteristics.

Canopies

Figure 3:
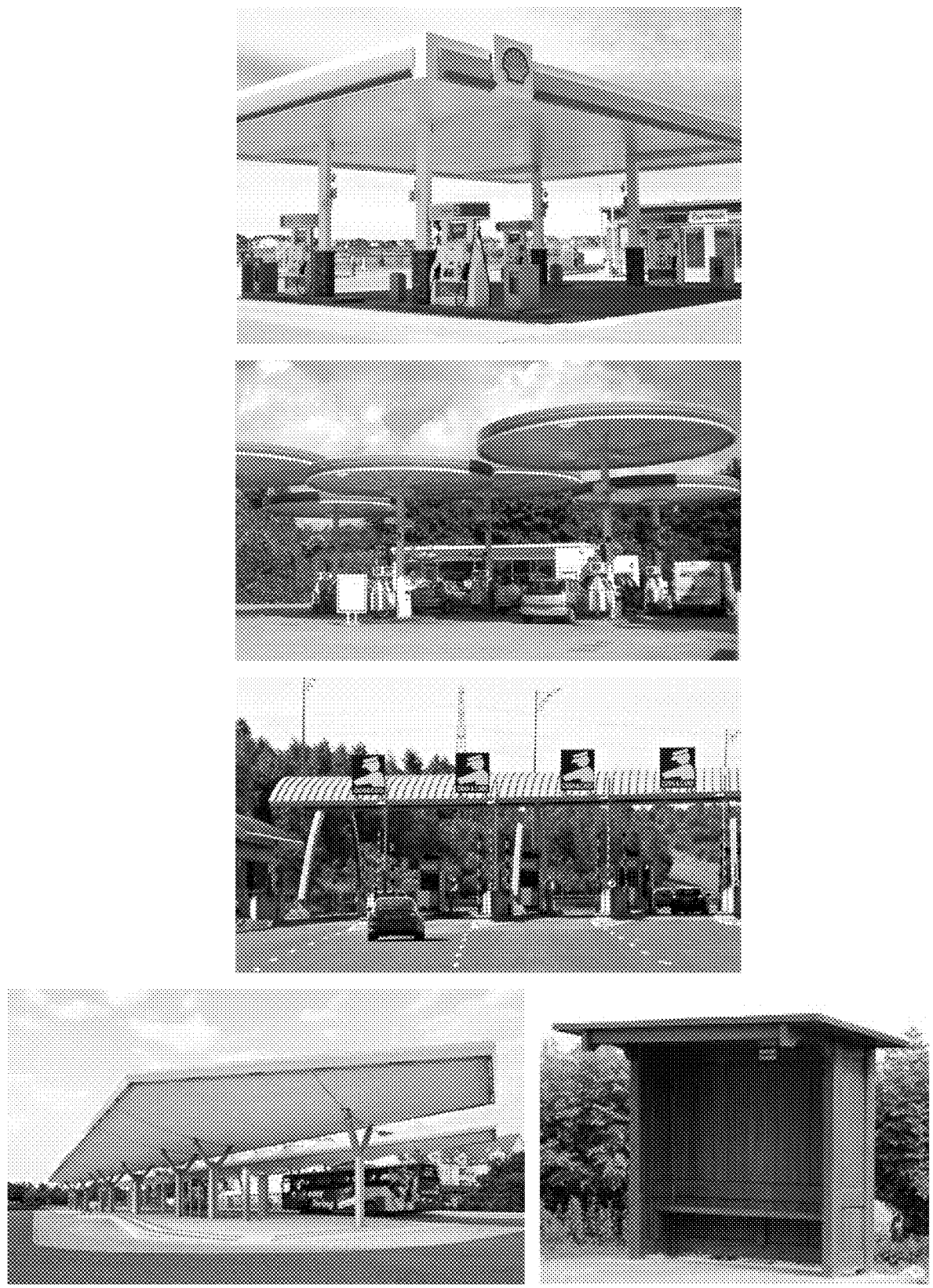
FIG. 3 shows photographs of examples of canopies according to the present disclosure.

A canopy is a free-standing roof structure which has at least one substantially open side between the roof and the ground. FIG. 3 shows photographs of examples of canopies at petrol station forecourts, a roadway tollbooth, a bus station, and a transit stop shelter.

A free-standing roof structure is a roof structure that is self-supporting (substantially from below, for example by pillars) and that does not extend laterally from a wall of a building. A side of a roof structure is a vertical surface that extends downwards from an edge of the roof to ground-level. The horizontal extent of the side corresponds to a side of the roof structure as viewed from above. For example, a roof structure that appears rectangular from above has four sides, one corresponding to each side of the rectangle.

In some embodiments, a side of a roof structure is a vertically-orientated planar shape (e.g. a rectangle or trapezium) extending from roof-level to ground-level. In other embodiments, a side of a roof structure is a vertically-orientated curved shape extending from a curved edge of a roof to ground-level.

A side of a roof structure may be open, closed or somewhere in between. A closed side corresponds to a surface that is physically present, for example a wall of a shed or a house. It will be appreciated that a closed surface may include portions which may be temporarily opened (doors, windows).

An open side is a virtual surface, i.e. a surface that is not physically present. For an open surface, there is no wall or other structural material (including transparent materials such as glass or plastic) separating the 'interior' of the building (e.g. a canopy) from the 'exterior'. An open side could correspond to where an exterior wall would be built if the roof were to be supported by a wall.

A side that is substantially open should be understood to mean that for at least a substantial proportion of the side, there is no wall or other structural material separating the 'interior' of the building from the 'exterior'. The substantial proportion may be 70%, 75%, 80%, 85%, 90%, or 95% for example. The non-open parts of a substantially open side may be pillars to support the roof.

As mentioned above, examples of canopies may be found at petrol station forecourts, roadway tollbooths, bus stations, and transit stop shelters, amongst other locations, as shown in FIG. 3. A shed and a house are examples of buildings which are not canopies, according to the present disclosure, because neither has at least one substantially open side. A roof overhang and an awning attached to the exterior wall of a building (e.g. for shelter or decorative purposes) are examples of roof structures that are not free-standing and which are therefore not canopies according to the present disclosure.

A full canopy is a free-standing roof structure which has all sides substantially open, i.e. has no closed sides. A bus stop shelter with one or more open sides is an example of a canopy which is not a full canopy, according to the present disclosure.

Non-Canopy Shadows

To identify canopy structures, the present disclosure uses the fact that the shadows cast by canopies are distinguishable from the shadows cast by buildings with substantially closed sides ('non-canopy buildings').

Figure 4A:
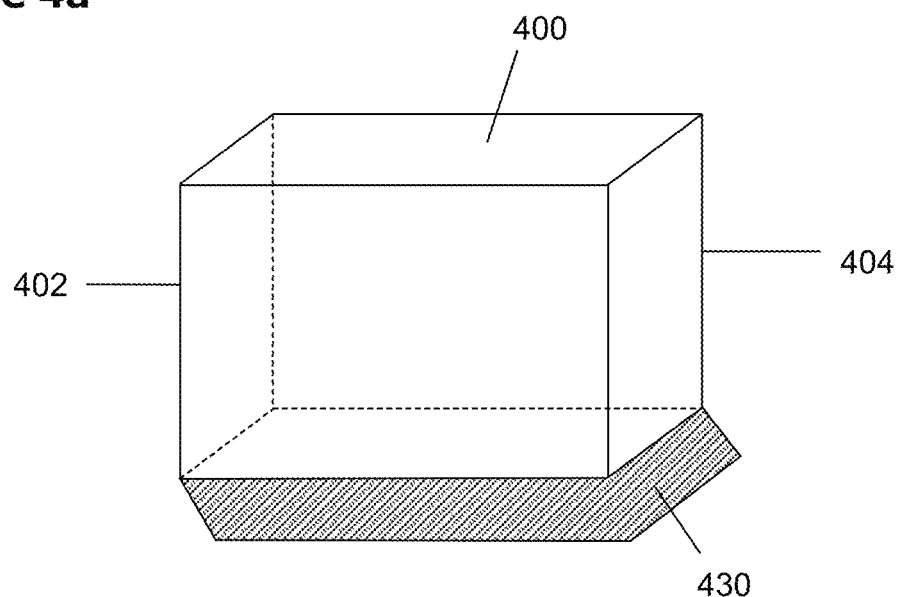
FIG. 4a shows a perspective view of a non-canopy building and a shadow cast by the building, according to one embodiment of the present disclosure.

FIG. 4a shows a perspective view of a non-canopy building 400 (such as an apartment block or office building) and a shadow 430 cast by the building 400, according to one embodiment of the present disclosure. As it is not a canopy, no sides of building 400 are substantially open and thus all sides may be considered to be closed.

Figure 4B:
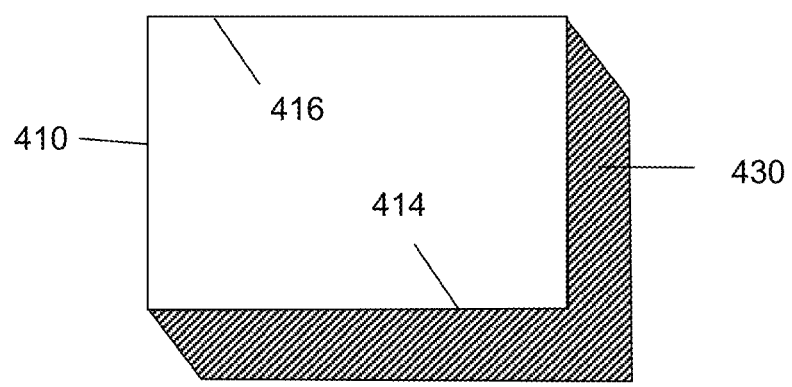

FIG. 4b shows a plan view of the same building 400 and its shadow 430. The plan view of building 400 in FIG. 4b is equivalent to a view of a building footprint 410 for the building 400. As is generally the case, an edge of the shadow cast by the building is in contact with a portion of the perimeter of the building footprint.

Figure 4C:
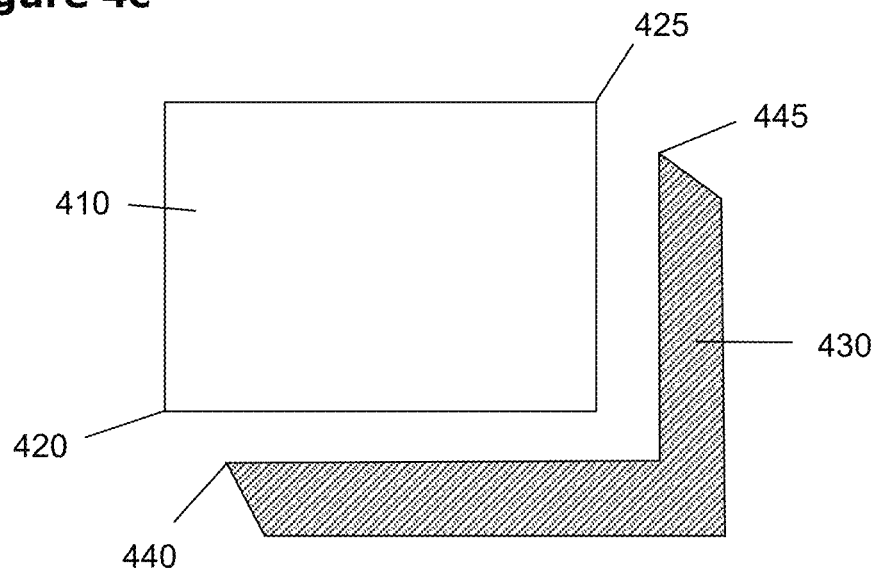
FIG. 4c shows the non-canopy building and shadow from FIG. 4b, separated for illustrative purposes.

FIG. 4c shows a plan view of the building 400 and its shadow 430 (as in FIG. 4b) but with the building and shadow separated from each other for illustrative purposes. FIG. 4c also shows two vertices 420, 425 of the building footprint 410, a start point 440 of the shadow 430 and an end point 445 of the shadow 430.

In FIG. 4c (and in other embodiments, including embodiments with polygonal building footprints), the vertices 420, 425 of the building footprint 410 are points at which two edges of the building footprint meet, or equivalently corners formed by two walls of the building meeting at vertical edges (for example vertical edges 402 and 404, shown in FIG. 4a and corresponding to vertices 420 and 425). In embodiments involving building footprints with one or more curved edges, vertices are defined differently. This is discussed below in relation to FIGS. 9a-9c.

The start point 440 and end point 445 of the shadow 430 are corners of the shadow. The start point 440 and end point 445 can be considered to be the first and last points of the shadow 430 at which the shadow is in contact with the perimeter of the building footprint 410. On one side of the start point 440 (or end point 445), the shadow perimeter is parallel to (e.g. in contact with/intersecting) an edge of the building footprint 410. On the other side, the shadow perimeter moves away from (e.g. is perpendicular to) the edge of the building footprint 410. The start 440 and end points 445 can also be considered as points where the shadow 430, the building footprint 410 and un-shadowed ground all intersect.

The start point 440 and end point 445 of the shadow 430 together define a shadowed side 414 and a non-shadowed side 416 of (the perimeter of) the building footprint 410 (or equivalently of the building 400). Light (from the Sun) is blocked from reaching the shadowed side 414 of the building 400, whereas light is not blocked from reaching the non-shadowed side 416 of the building 400. The shadowed side 414 and non-shadowed side 416 each run along the perimeter of the building footprint 410 between the start point 440 and end point 445 on a different respective side of the building 400 (thus all of the perimeter of the building footprint 410 is part of either the shadowed 414 or unshadowed side 416). In this embodiment, each of the shadowed and non-shadowed sides 414, 416 comprises two edges of the building footprint 410. The shadowed and non-shadowed sides 414, 416 may be considered to be opposing sides of the building footprint 410.

In this embodiment, light is blocked from reaching all of the shadowed side 414 of the building footprint 410 and is not blocked from reaching any of the non-shadowed side 416. In other embodiments, light may reach some parts of the shadowed side (as in FIG. 8b) and/or may be blocked from reaching some parts of the non-shadowed side (as in FIG. 8c). The term shadowed side should be interpreted as meaning a side which is substantially in shadow, in contrast to the unshadowed side which is a side that is substantially not in shadow.

For the non-canopy building in FIGS. 4a-4b, it will be appreciated that the start point 440 and end point 445 of the shadow 430 are each coincident with a vertex 420, 425 of the building footprint 410.

It will be appreciated that the above comments about building footprint vertices, start and end points of a shadow, and shadowed and non-shadowed side of a building footprint are generally applicable to buildings—including to canopy structures—and are not limited to the specific embodiment of FIGS. 4a-4c.

Figure 4D:
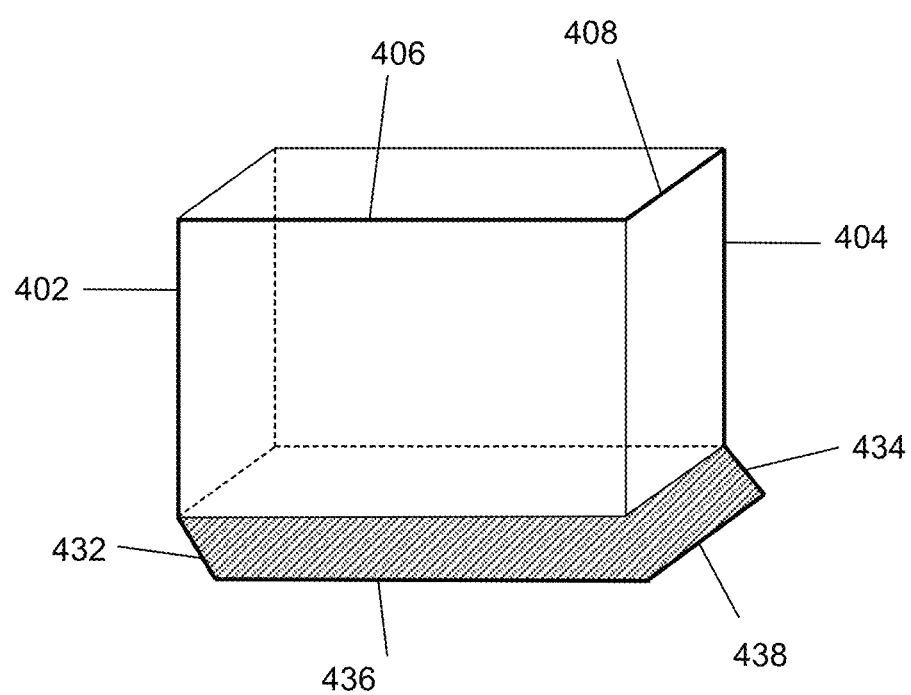

FIG. 4d shows the non-canopy building 400 and shadow 430 from the same perspective view as FIG. 4a. Two edges 406, 408 of the roof of building 400 are marked. These edges correspond to (and may be considered to cause) edges 436 and 438 of shadow 430. Two vertical edges 402, 404 of building 400 are also marked. These vertical edges correspond to (and may be considered to cause) edges 432 and 434 of the shadow 430.

Canopy Shadows

Figure 5A:
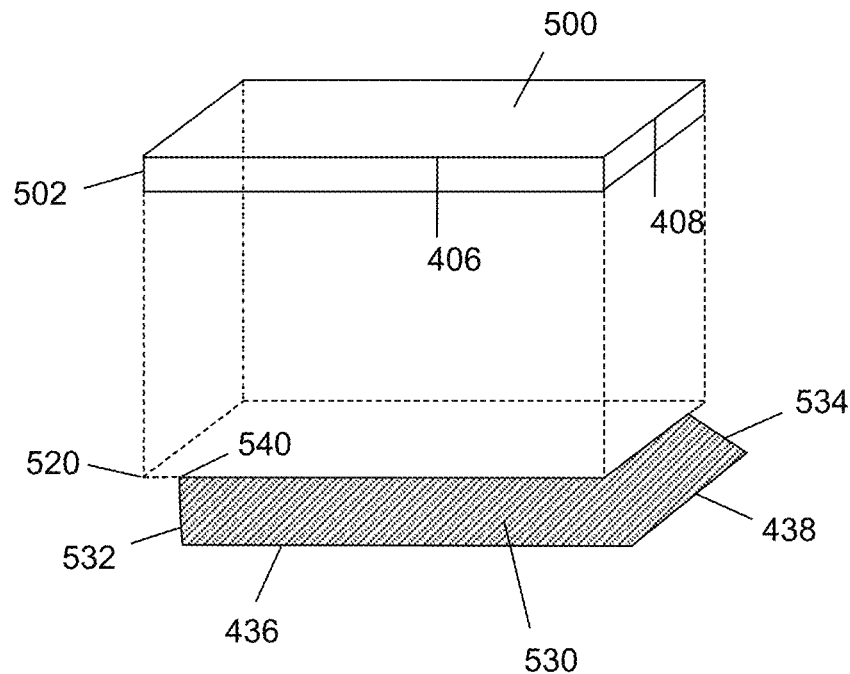
FIG. 5a shows a perspective view of a canopy and a shadow cast by the canopy, according to one embodiment of the present disclosure.

FIG. 5a shows a perspective view of a canopy 500 and a shadow 530 cast by the canopy 500, according to one embodiment of the present disclosure. For illustrative purposes, canopy 500 may be considered to be the roof of building 400. Canopy 500 is supported (substantially from below) by a support structure such as pillars (not shown). Dashed lines indicate the projection of the canopy 500 vertically downwards to the ground, for illustrative purposes. These dashed projection lines also show where the rest of building 400 would be in relation to its roof/canopy 500, if it were present. The shadow 530 is caused by a light source (the Sun) having the same position as in FIGS. 4a and 4b for the non-canopy building 400.

It will be appreciated that the canopy 500 may cast more of a shadow than shadow 530. For example, the canopy 500 may cast a shadow in the region directly underneath the canopy (therefore within the canopy footprint 510). This is not shown in FIG. 5a, nor considered elsewhere in the present disclosure, because such shadows would not be visible in overhead images. All discussion in the present disclosure about shadows cast by buildings relates to the parts of the shadows which are visible from an overhead view of the buildings.

Figure 5B:
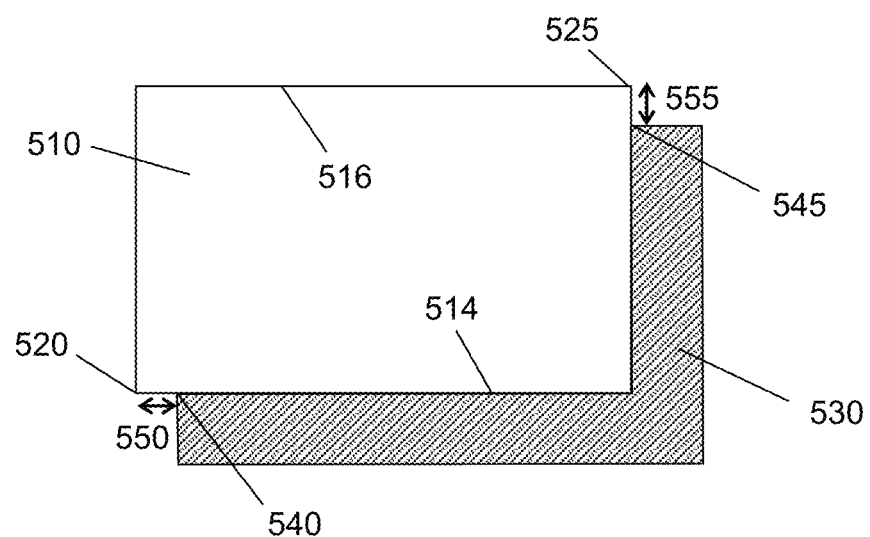

FIG. 5b shows a plan view of the canopy 500 and shadow 530. The plan view of the canopy 500 in FIG. 5b is equivalent to a view of the building footprint, more specifically a canopy footprint 510. Two vertices 520, 525 of the building footprint 510, a start point 540 of the shadow 530 and an end point 545 of the shadow 530 are also shown.

Due to the differences in the structures of the two buildings 400 and 500, the shadow 530 cast by the canopy 500 in FIGS. 5a-b is different from the shadow 430 cast by the non-canopy building 400 in FIGS. 4a-b. Both buildings 400, 500 contain roof edges 406 and 408. These edges block/prevent the same light rays from reaching the ground, causing both shadows 430, 530 to contain edges 436, 438. However, the canopy building 500 does not include all of the vertical edges 402 and 404 of the non-canopy building 400. Thus some light rays that are blocked by the vertical edges 402, 404 of non-canopy building 400 are not blocked by canopy building 500, leading to a smaller shadow. As the vertical edges 402, 404 of the non-canopy building correspond to edges 432, 434 of the non-canopy shadow 430, the canopy shadow 530 does not contain these edges 432 and 434. Instead, the canopy shadow 530 contains edges 532 and 534.

In the canopy shadow 530, the start point 540 and end point 545 of the shadow 530 are not coincident with a vertex of the canopy footprint 510. Instead, there is an offset 550 (or a gap) between the start point 540 and a first proximate vertex 420, and an offset (or gap) 555 between the end point 545 and a second proximate vertex 525. The vertex of the canopy footprint that is 'proximate' to the start point is the nearby vertex which corresponds to the part/corner of the canopy which causes the start point of the shadow (i.e. which blocks light rays which would otherwise have reached the ground at the start point of the shadow). For example, vertex 520 of the canopy footprint is near to the start point 540 and corresponds to the part/corner of the canopy 500 which causes the start point 540 of the shadow. The vertex 525 of the canopy footprint 510 proximate to the end point 545 of the shadow is similarly defined. In most cases, the proximate vertex will be the vertex of the canopy footprint that is nearest to the start point or end point.

In some embodiments, the offsets 550, 555 between the start/end points 540, 545 of the shadow 530 and the vertices 420, 425 of the building footprint 510 may correspond to absolute distances in the real-world. For example, an offset may correspond to an absolute physical distance along the ground between a corner of the canopy projected down to the ground and the proximate start/end point of the shadow (inherently on the ground). In some embodiments, the offset may be given as an absolute real-world distance value (e.g. 2 meters). The absolute real-world distance may be calculated by combining a distance measured from the building footprint, shadow and/or overhead image with a known scale. For example, a distance of 5 mm measured from the image may be combined with a 1:400 scale (i.e. 1 cm in the image corresponds to 4 meters) to obtain an absolute real-world offset distance of 2 meters. In some embodiments, the offset may be given not as an absolute real-world distance value, but it may nevertheless correspond to absolute real-world distances when combined with a known scale. For example, the offset may be given as an in-image distance, e.g. 5 mm or 40 pixels.

In other embodiments, the offsets may be expressed as relative measurements, for example as fractions of the length of the edge of the building footprint along which the offset occurs. For example, an offset of 1 meter (in the real world) may occur along a wall of the building/edge of the building footprint which is 20 meters long (in the real world). This may be represented as a relative offset of 1/20, 5%, 1:20, 0.05 or other equivalent relative measurement.

Figure 6A:
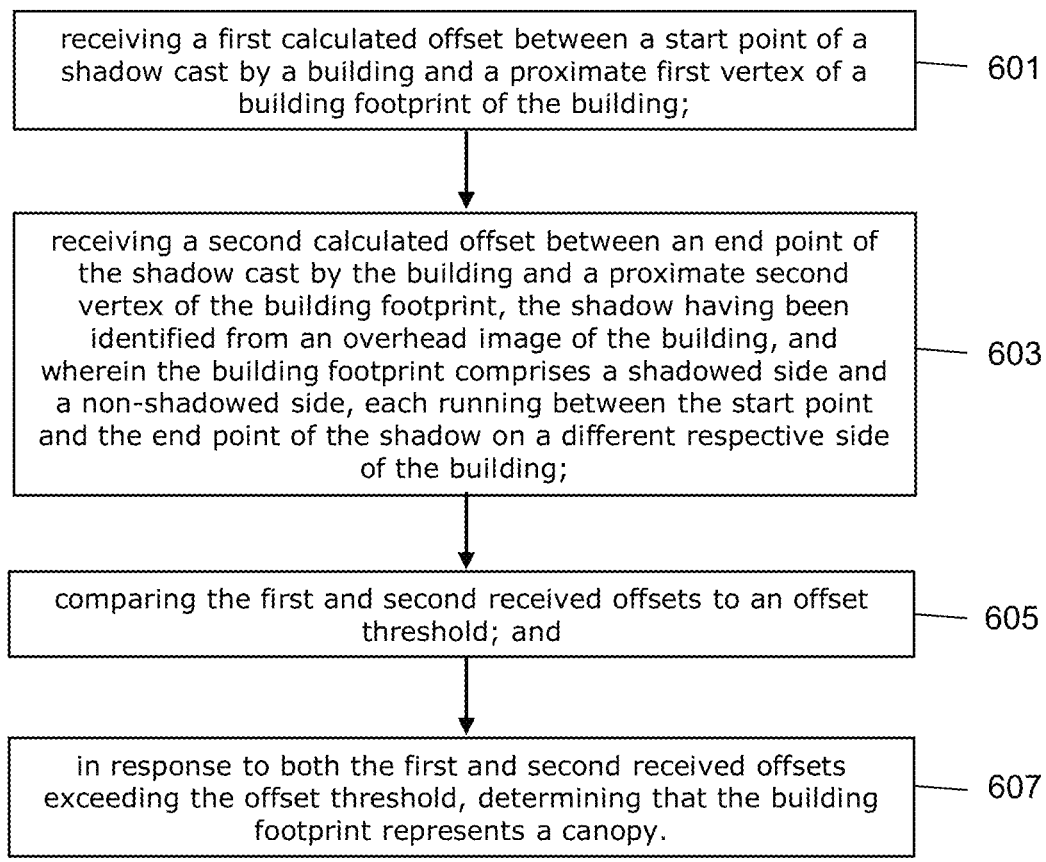
FIG. 6a shows schematically the steps of a method in accordance with some aspects of the present disclosure.

The Method of FIG. 6a

Figure 2:
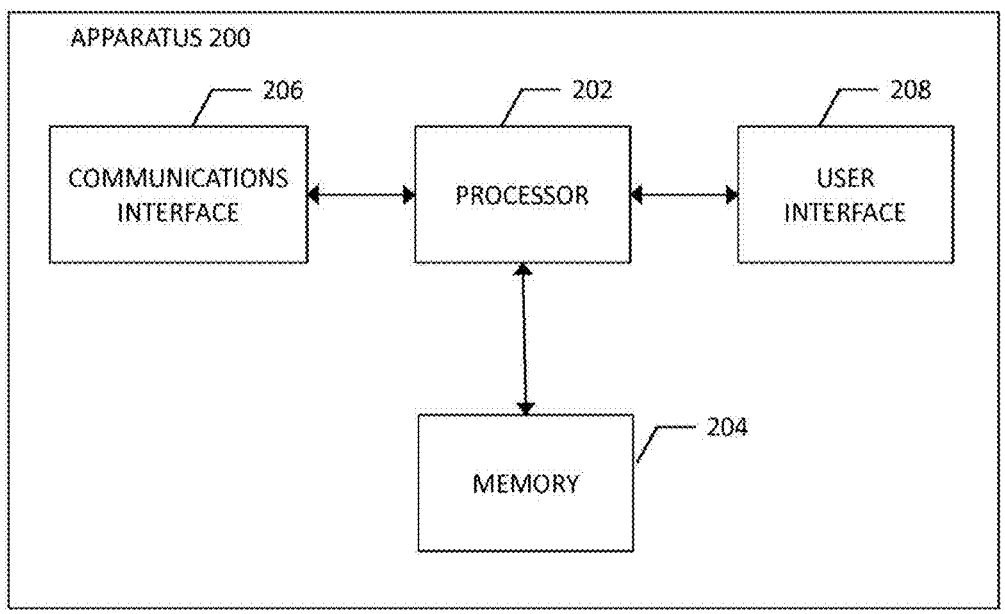
FIG. 2 shows an apparatus according to one embodiment of the present disclosure.

FIG. 6a shows the steps 601-607 of a computer-implemented method 600 in accordance with some aspects of the present disclosure. Method 600 may be performed by various apparatus/entities, including processing server 102 and mobile device 114 as shown in FIG. 1 and apparatus 200 as shown in FIG. 2.

The method 600 comprises: receiving a first calculated offset between a start point of a shadow cast by a building and a proximate first vertex of a building footprint of the building 601; receiving a second calculated offset between an end point of the shadow cast by the building and a proximate second vertex of the building footprint, the shadow having been identified from an overhead image of the building, and wherein the building footprint comprises a shadowed side and a non-shadowed side, each running between the start point and the end point of the shadow on a different respective side of the building 603; comparing the first and second received offsets to an offset threshold 605; and in response to both the first and second received offsets exceeding the offset threshold, determining that the building footprint represents a canopy 607. Method steps 601-607 are discussed further below.

In step 601 of method 600, a first calculated offset is received, the first calculated offset being between a start point of a shadow cast by a building and a proximate first vertex of a building footprint of the building. In one embodiment, offset 550 (from FIG. 5b) may be received as the first offset, where offset 550 is between the start point 540 of the shadow 530 cast by canopy building 500 and proximate first vertex 520 of the canopy footprint 510.

In step 603, a second calculated offset is received, the second calculated offset being between an end point of the shadow cast by the building and a proximate second vertex of the building footprint. In one embodiment, offset 555 (from FIG. 5b) may be received as the second offset. Building vertices, proximate start and end points, and offsets are discussed above in relation to FIGS. 4b-4c and 5a-5b.

The start point and end point of the shadow define a shadowed-side and a non-shadowed-side of the building footprint (e.g. sides 514 and 516 in FIG. 5b). These each run (along the perimeter of the building footprint) between the start point and the end point of the shadow on a different respective side of the building. The shadow has been identified from an overhead image of the building, for example an image taken by a satellite, an unmanned aerial vehicle or a manned aerial vehicle).

In some embodiments, the two calculated offsets may be internally transmitted by and received at an apparatus performing the method 600, for example an apparatus which also calculates the two offsets. In other embodiments, the two offsets may be transmitted by a separate apparatus (for example a separate apparatus which calculated the two offsets) and received by the apparatus performing the method 600.

In step 605 of method 600, the first and second received offsets are (each) compared to an offset threshold. As discussed above in relation to FIG. 5b, the first and second offsets may correspond to absolute real-world distance values (e.g. 2 meters) or relative values (e.g. 5% of the length of the edge of the canopy footprint along which the offset occurs). Accordingly, the offset thresholds may also correspond to absolute real-world distance thresholds or relative thresholds.

In some embodiments, the (absolute distance) offset threshold may correspond to at least one or more of 0.25 meters, 0.5 meters, 1 meter, 1.5 meters, 2 meters or 2.5 meters at a real-world scale. This may be directly expressed as the absolute real-world distance value (e.g. 2 meters) or as an in-image distance (e.g. 1 cm, 100 pixels) in combination with a known scale. In some embodiments, the (relative) offset threshold may be a threshold fraction of a length of an edge of the building footprint, the edge being an edge associated with the offset. The offset threshold may be at least one or more of 2%, 5%, 10%, 15% or 20% (or equivalent expressions). (In this paragraph, the term 'at least' should be read in the sense of 'equal to or higher than' in this paragraph).

In some embodiments, the same offset threshold is used regardless of the size of the building footprint or other factors. In some embodiments, different offset thresholds may be used for different sizes of building footprint (e.g. based on a dimension, a longest dimension or an area of the building footprint). In some embodiments, different offset thresholds may be used for different overhead image resolutions. In some embodiments, the value of the offset threshold may be chosen to avoid awnings, roof overhangs or other small protrusions from the side of a non-canopy building from being identified as canopies.

In step 607 of method 600, it is determined that the building footprint represents a canopy, in response to both the first and second received offsets exceeding the offset threshold. For example, if the first and second received offsets are absolute distance measurements of 1.5 meters and 2 meters, and the offset threshold is 1 meter, then in response to the two offsets exceeding the offset threshold, it is determined that the building footprint represents a canopy building.

The method 600 provides a simple, efficient way of identifying and distinguishing canopy buildings from non-canopy buildings, using the fact that shadows cast by canopy buildings are offset from the vertices of the canopy building footprint, whereas shadows cast by non-canopy buildings join/intersect the building footprint at its vertices, i.e. are not offset.

Figure 6B:
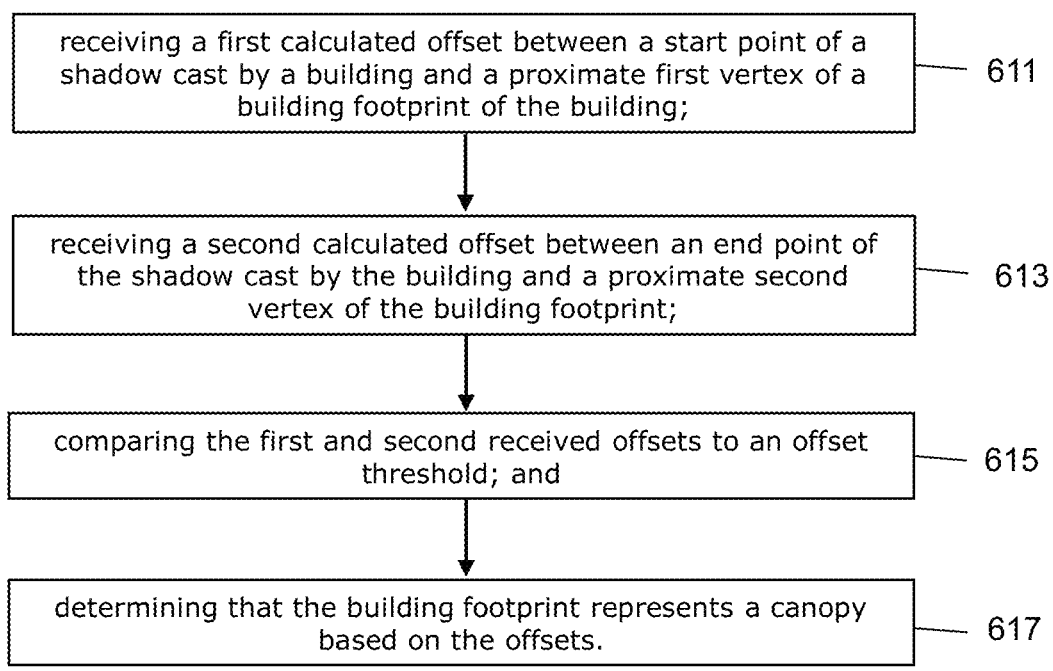
FIG. 6b shows schematically the steps of a method in accordance with some aspects of the present disclosure.

The Method of FIG. 6b

FIG. 6b shows the steps 611-617 of a computer-implemented method 610 in accordance with some aspects of the present disclosure. Method 610 may be performed by various apparatus/entities, including processing server 102 and mobile device 114 as shown in FIG. 1 and apparatus 200 as shown in FIG. 2.

The method 610 comprises: receiving a first calculated offset between a start point of a shadow cast by a building and a proximate first vertex of a building footprint of the building 611; receiving a second calculated offset between an end point of the shadow cast by the building and a proximate second vertex of the building footprint 613; comparing the first and second received offsets to an offset threshold 615; and determining that the building footprint represents a canopy based on the offsets 617.

Other Method Steps

Various other method steps may optionally be performed according to some embodiments of the present disclosure. It will be appreciated that whilst it may be necessary for several of the steps disclosed below to have been performed prior to the steps 601-607 of method 600 and steps 611-617 of method 611, the actual performance of these steps is not required by the present disclosure.

Optionally, the shadow may be identified from the overhead image of the building. In some embodiments, the shadow may be identified using methods from U.S. patent application Ser. No. 16/448,753, hereby incorporated by reference in its entirety. In U.S. Ser. No. 16/448,753, a shadow layer that accurately represents the shadows of one or more buildings is generated from a raster image of the buildings. Pixel values are extracted from the raster image and processed so as to retain pixel values within a predefined range while eliminating other pixel values. The pixel values that are retained represent a shadow. The location(s) of the one or more building may be known in advance or identified from the raster image using existing techniques. In other embodiments, different methods of identifying a shadow cast by a building from an overhead image can be used and are within the scope of the present disclosure.

Optionally, the start point of the shadow and the end point of the shadow may be identified from the shadow. In some embodiments, the start end points may be identified by determining two points along the perimeter of the shadow at which the building footprint, shadow and un-shadowed-ground all intersect. In some embodiments, the start and end points may be identified by determining two corners of the shadow which are in contact with the building footprint (e.g. are located on the boundary line(s) at which the building footprint and shadow meet. Various methods of corner identification are known. For example, points at which the gradient of the perimeter of the shadow is discontinuous may be identified. In some embodiments, the start and end points may be identified by determining which parts of the shadow perimeter are perpendicular to a proximate edge of the building footprint, and taking as start and end points the intersection of these parts of the shadow perimeter with the building footprint.

In some embodiments, a start point and end point of the shadow may be identified from more than two candidate start/end points. For example, a shadow identified from an overhead image may comprise multiple shadow portions (a 'discontinuous' shadow), such as in FIGS. 8b and 8c, giving rise to more than two candidate start/end points. Various factors may be considered to determine which of the multiple candidate start/end points should be used as the start point and the end point. For example, an offset to a proximate vertex may be calculated for each of the candidate start/end points, and the two points resulting in the largest offsets may be chosen. In another example, the start point and end point which minimise the amount of unshadowed region on the shadowed side of the building footprint and/or minimise the amount of shadowed region on the unshadowed side of the building footprint may be chosen. In another example, candidate points which are next to long stretches of shadowed building footprint and/or long stretches of unshadowed building footprint may be prioritised over candidate points which are next to short stretches of shadowed building footprint and/or unshadowed building footprint. Multiple methods may also be used in combination.

Optionally, the building footprint may be identified from the overhead image. In other embodiments, the building footprint may be retrieved from a record (e.g. a building record) of a geographic database prior to use in one or more steps below.

Optionally, one or more vertices of the building footprint may be identified. In some embodiments, the vertices may be identified using known methods for identifying corners of polygons. Embodiments involving building footprints having one or more curved edges are discussed in a later section.

Optionally, for each of the start point and the endpoint of the shadow, a proximate vertex of the building footprint may be identified. In some embodiments, the vertex of the canopy footprint that is nearest to the start point or end point of the shadow may be identified as the proximate vertex. In some embodiments, one or more checks may be performed on the nearest vertex to avoid identification of an erroneous proximate vertex (i.e. a nearby vertex that does not correspond to the part/corner of the canopy which causes the start or end point of the shadow). For example, it may be checked that the nearest vertex of the canopy footprint is not in contact with the shadow.

Optionally, the first offset (between the start point of a shadow cast by a building and the proximate first vertex of the building footprint) may be calculated. The second offset (between the end point of the shadow cast by the building and the proximate second vertex of the building footprint) may be calculated. As discussed above, the offsets may correspond to absolute real-world distance offsets (e.g. 1 meter) or as relative distance offsets (e.g. 5% of the length of the wall that the offset is along). Calculating both types of offset involves taking a measurement of an offset distance (between the start/end point of the shadow and its proximate building footprint vertex) from the building footprint and/or shadow. For example, an offset of 5 mm or 40 pixels may be measured. The offset may be expressed as this measured distance (in combination with a known scale). The offset may be expressed as an absolute real-world offset distance (e.g. 1 meter) by combining this measured distance with a known scale. The offset may be expressed as a relative distance offset (e.g. 5%) by combining this measured distance (or an absolute distance) with a corresponding (measured or absolute) distance for the edge of the building footprint along which the offset occurs.

Optionally, prior to calculating the first and second offsets, the building footprint and shadow may be aligned, to ensure that the offset distance is accurately and reliably calculated. In some embodiments, the building footprint and shadow may be aligned by aligning the boundary lines at which the building footprint and shadow meet.

Optionally, it may be determined that the building footprint represents a full canopy, in response to both the first and second received offsets exceeding the offset threshold. As previously mentioned, a full canopy is a free-standing roof structure which has all sides substantially open, i.e. has no closed sides.

Optionally, if neither the first or second received offsets exceed the offset threshold, it may be determined that the building footprint does not represent a canopy. If only one of the first and second received offsets exceed the threshold, it may be determined that the building footprint does not represent a canopy. In other embodiments, it may be determined that the building footprint (with only one offset exceeding the threshold) could potentially represent a canopy but that further investigation of the image, shadow and/or building footprint is required before the building is classified.

Optionally, a geographic database (e.g. map database 108 in FIG. 1) may be updated to indicate that the building represented by the building footprint is a canopy. Updating a geographic database may comprise inserting a new data record and/or modifying an existing data record. The data record may be a building data record.

Worked Examples

Figure 7A:
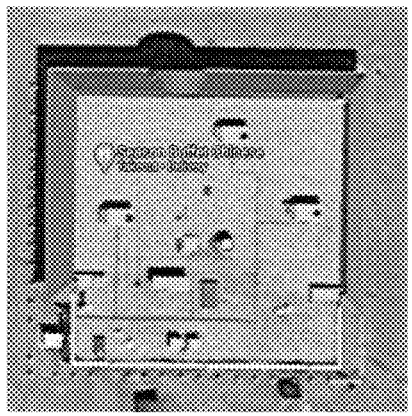
FIG. 7a shows an overhead image of a non-canopy building.
Figure 7B:
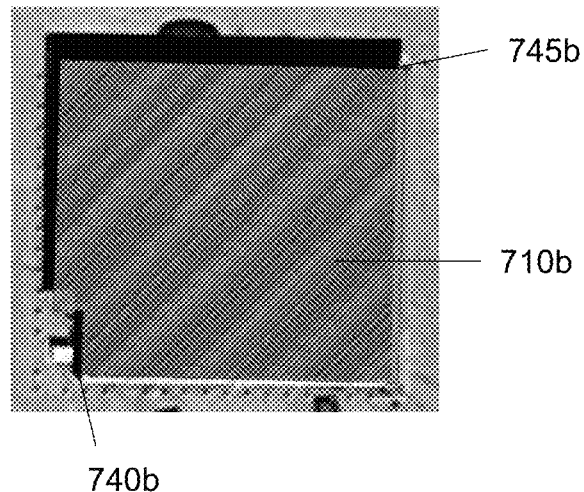
FIG. 7b shows an overhead image of a non-canopy building.

FIG. 7a shows an overhead image of a (non-canopy) building and a shadow cast by the building. FIG. 7b shows the same overhead image with a building footprint 710b superimposed on the image and the start and end points 740b, 745b of the shadow indicated. In the image, there is no gap or only a small gap between the start and end points of the shadow and the nearby vertex of the superimposed building footprint, as would be expected for a non-canopy building. Thus, when the offsets calculated between the start/end points and their proximate vertices are compared to the offset threshold, the offset threshold will not be exceeded and it will not be determined that the building is a canopy building.

Figure 7C:
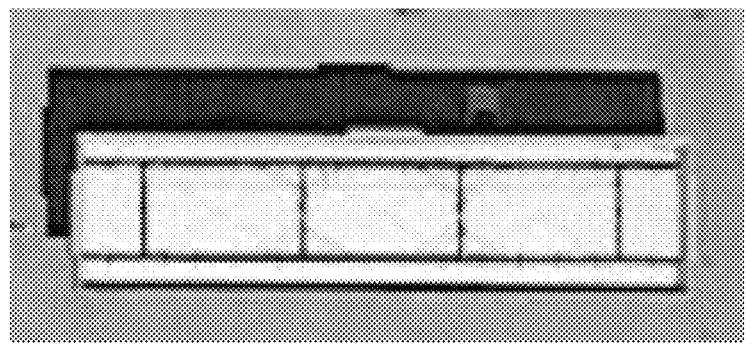
FIG. 7c shows an overhead image of a canopy, according to one embodiment of the present disclosure.

FIG. 7c shows an overhead image of a (canopy) building and a shadow cast by the building. The shadow can be identified from the image prior to the method 600 or 610, for example using a method from U.S. patent application Ser. No. 16/448,753. In some embodiments, the building footprint may also be identified from the image prior to the method 600 or 610.

Figure 7D:
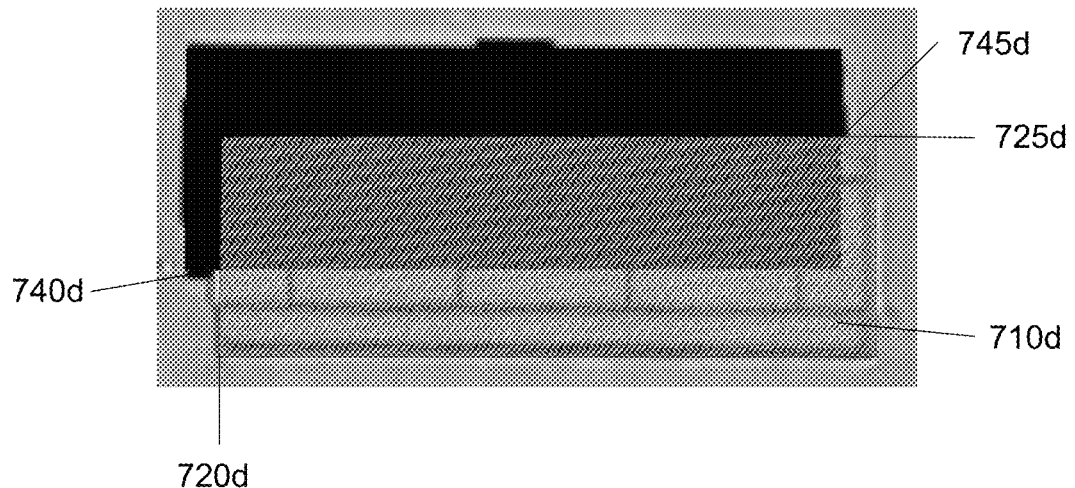
FIG. 7d shows an overhead image of a canopy, according to one embodiment of the present disclosure.

FIG. 7d shows the same overhead image as FIG. 7c, with a building footprint 710d (e.g. identified from the image or retrieved from a geographic database) superimposed. The start point 740d and end point 745d of the shadow are indicated, as are the first and second proximate vertices 720d, 725d of the building footprint 710d. There are significant gaps/offsets between the start point 740d and the first proximate vertex 720d and the end point 745d and the second proximate vertex 725d. These offsets can be calculated (prior to the method 600 or 610) and compared to an offset threshold (in step 605 or 615). It can then be determined, based on the offsets, that the building footprint represents a canopy (in step 617). For example, when it is found that both offsets exceed the offset threshold, it is determined that building footprint X represents a canopy (in step 607).

Other Examples of Canopy Footprints

It will be appreciated that the methods 600, 610 (and the above optional method steps) may be applied to identify a wide variety of canopies, not just the rectangular footprints shown in FIGS. 5b and 7c-d. For example, FIG. 8a shows a plan view of an irregularly shaped (i.e. non-rectangular) building footprint 810a and shadow 830a, where the building is identifiable as a canopy due to the two offsets.

Figure 8A:
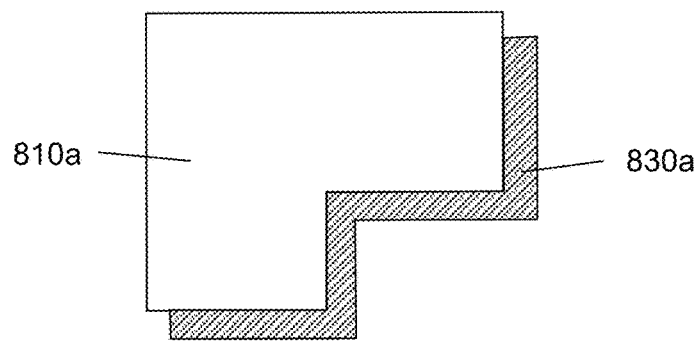
FIG. 8a shows a plan view of an irregularly shaped canopy footprint and a shadow cast by the canopy, according to one embodiment of the present disclosure.
Figure 8B:
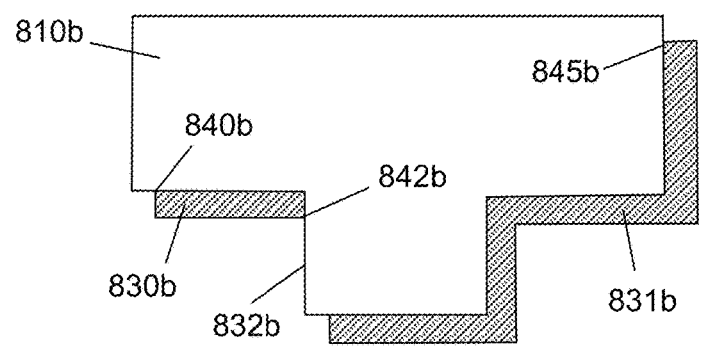
FIG. 8b shows a plan view of an irregularly shaped canopy footprint and a discontinuous shadow cast by the canopy, according to one embodiment of the present disclosure.
Figure 8C:
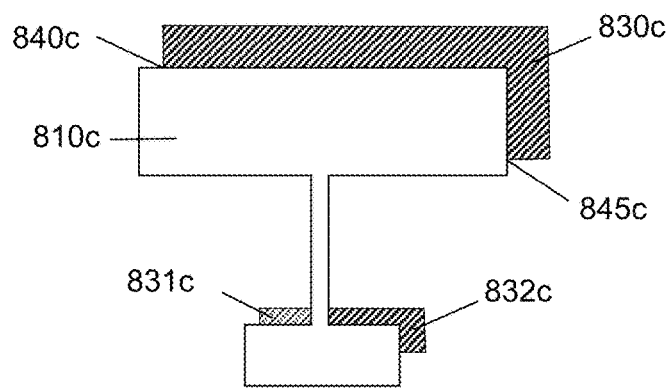
FIG. 8c shows a plan view of an irregularly shaped canopy footprint and a shadow cast by the canopy, according to one embodiment of the present disclosure.
Figure 8D:
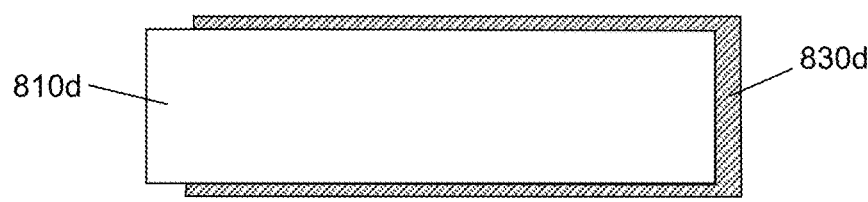
FIG. 8d shows a plan view of a canopy footprint and a shadow cast by the canopy, according to one embodiment of the present disclosure.
Figure 9A:
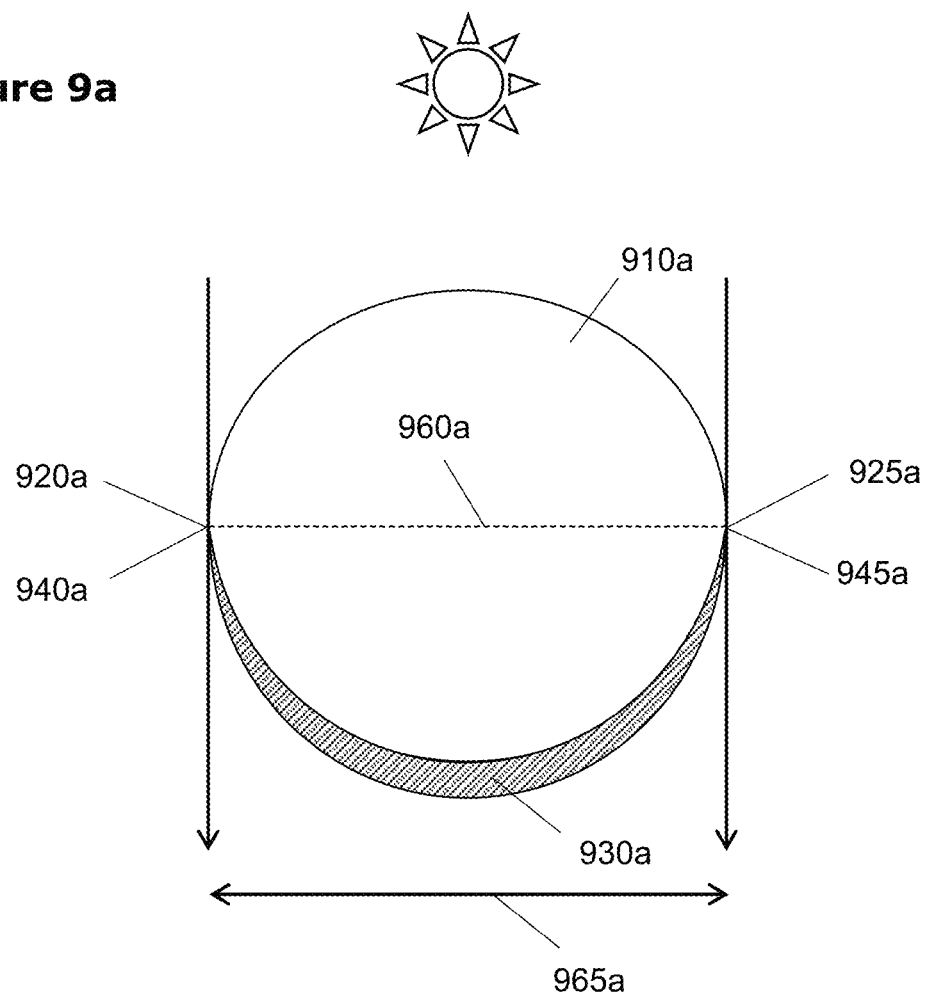
FIG. 9a shows a circular non-canopy building footprint and a shadow cast by the building, according to one embodiment of the present disclosure.
Figure 9D:
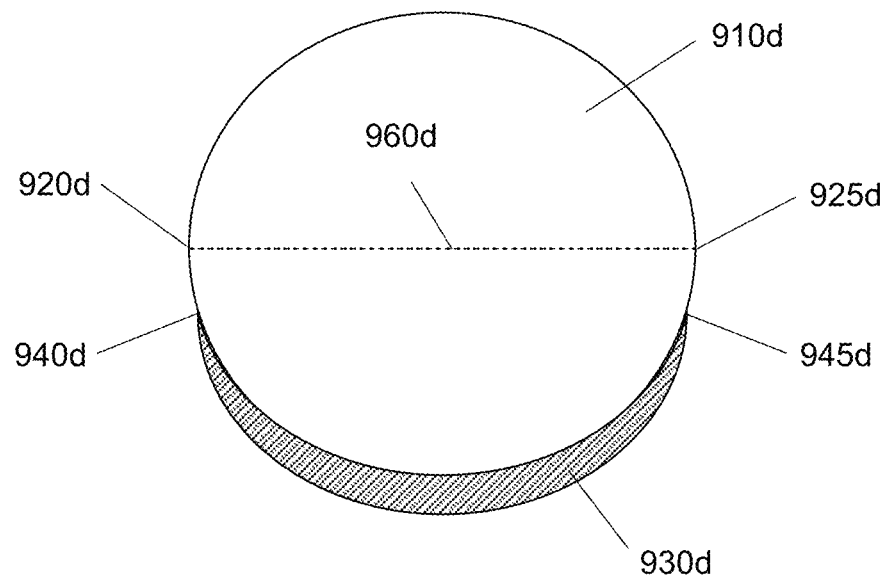
FIG. 9d shows a circular canopy footprint and a shadow cast by the canopy, according to one embodiment of the present disclosure.
Figure 9B:
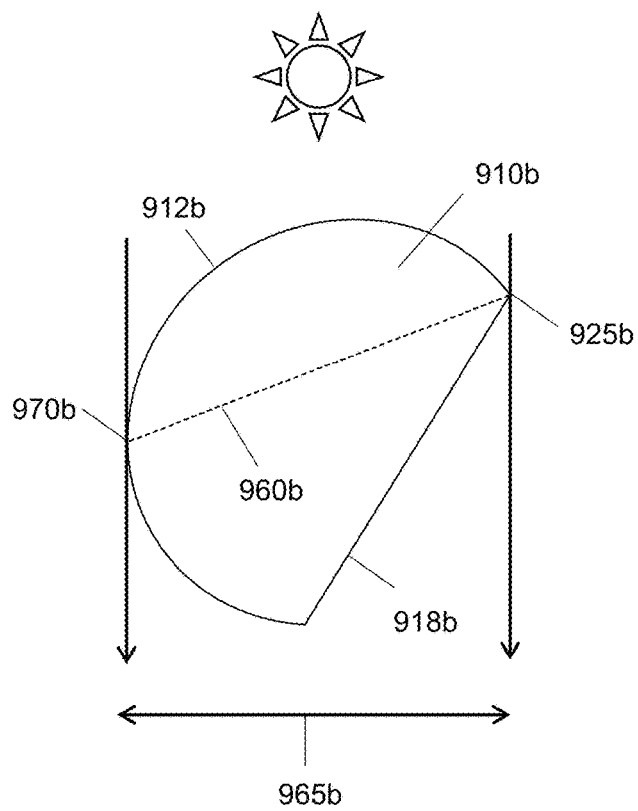
FIG. 9b shows a partially curved, partially straight-edged canopy footprint, according to one embodiment of the present disclosure.
Figure 9C:
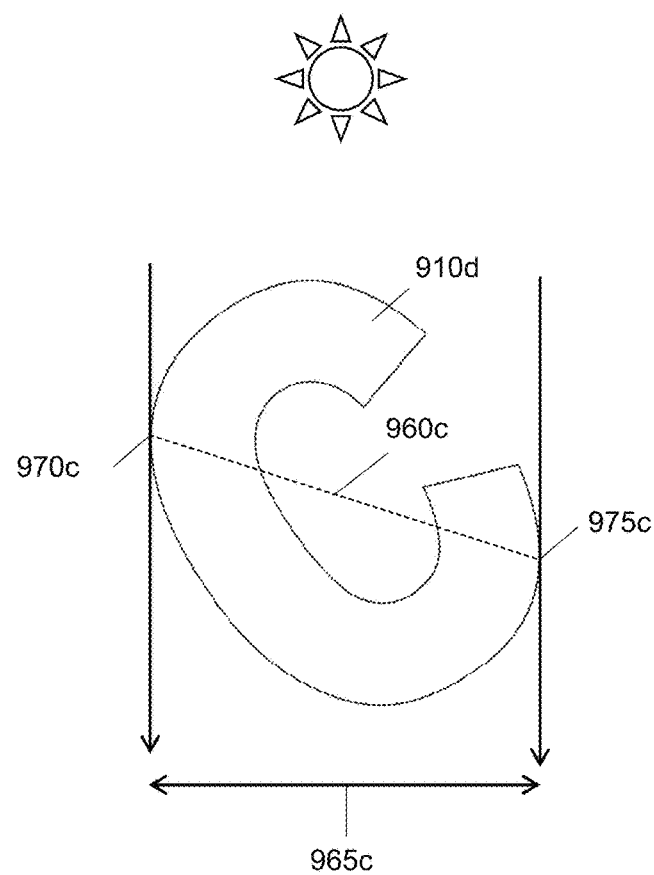
FIG. 9c shows a partially curved, partially straight-edged canopy footprint, according to one embodiment of the present disclosure.

FIGS. 8b-8d and 9b-9d show other examples of canopies/canopy footprints to which the methods 600 and 610 can be applied. FIG. 8b illustrates a discontinuous shadow, or equivalently a shadowed side of a canopy footprint having an unshadowed portion. Similarly, FIG. 8c illustrates an unshadowed side of a canopy footprint having shadowed portions. FIG. 8d illustrates a shadowed side which extends to three sides of a rectangular canopy footprint. FIGS. 9b-9d show canopy footprints with at least one curved edge.

In both FIGS. 5b and 8a, the shadow 530, 830a cast by the canopy is a continuous shadow with no breaks in the shadow between the start point and end point. However, the shadow of methods 600, 610 does not need to be a continuous shadow. In some embodiments (such as in FIG. 8b, described below), the shadow can be a discontinuous shadow FIG. 8b shows a plan view of an irregularly shaped canopy footprint 810b and a discontinuous shadow cast by the canopy. In this embodiment, the discontinuous shadow comprises two shadow portions 830b, 831b with a non-shadowed portion 832b between the two shadow portions on the shadowed side of the canopy footprint. The shadowed side of the canopy footprint runs between the start point 840b and end point 845b of the shadow, including through the non-shadowed portion 832b as well as the shadowed portions 830b, 831b. Light is blocked from reaching most, but not all, of the shadowed side of the canopy footprint.

Similarly in other embodiments, the shadow may be a discontinuous shadow including multiple shadowed portions with one or more non-shadowed portions in between on the shadowed side of the canopy footprint.

It will be appreciated that for a discontinuous shadow, the offsets will be measured from a start point and end point at either end of the discontinuous shadow. These start and end points give reliable information about how far a shadow is offset due to the canopy-structure of a building. Offsets are not measured from points in the middle of the discontinuous shadow. For example, point 842*b* is where a shadowed portion adjoins a non-shadowed portion, in the middle of the discontinuous shadow. An offset measured from this point 842*b* to a proximate vertex of the building footprint would have no useful physical meaning.

FIG. 8*c* shows a plan view of an irregularly shaped canopy footprint 810*c* and three shadow portions 830*c*, 831*c*, 832*c* cast by the canopy, according to one embodiment of the present disclosure. One shadow portion 830*c* is substantially larger than the other two 831*c*, 832*c*. In this embodiment, the 'shadow' (for methods 600 and 610) comprises only this largest shadow portion 830*c*. The start point 840*c* and end point 845*c* of the shadow are at either end of this largest shadow portion 830*c*, and together they define a shadowed side and an unshadowed side of the canopy footprint. The shadowed side runs along the perimeter of the canopy footprint between the start and end points 840*c*, 845*c*, through the largest shadow portion 830*c* only. The unshadowed side of the canopy footprint is the rest of the perimeter of the canopy footprint, including the parts which are within the two small shadow portions 831*c*, 832*c*. As previously mentioned, 'unshadowed' means substantially (not necessarily entirely) not in shadow, and is used to contrast with the shadowed side which is at least substantially (not necessarily entirely) in shadow.

FIG. 8*d* shows a plan view of a long rectangular canopy footprint 810*d* and a (continuous) shadow 830*d* cast by the canopy, according to one embodiment of the present disclosure. As previously, the shadowed and non-shadowed sides run between the start point and end point of the shadow on different sides of the building. In this embodiment, the shadowed side of the canopy spans nearly three of the four edges of the canopy footprint and the non-shadowed side just over one edge.

Building Footprints with Curved Edges

FIGS. 9*a*-9*d* show four building footprints having one or more curved edges, according to embodiments of the present disclosure. FIG. 9*a* shows a circular non-canopy building footprint 910*a*. FIGS. 9*b* and 9*c* both show partially curved, partially straight-edged canopy footprints 910*b* and 910*c*. FIG. 9*d* shows a circular canopy footprint 910*d* (similarly to FIG. 9*a* but for a canopy). FIGS. 9*a*-9*c* illustrate three examples of how vertices are defined for a curved edge building footprint. FIGS. 9*a* and 9*d* illustrate how a canopy with one or more curved edges may be identified using its shadow.

A vertex of a building footprint has previously been defined, for some embodiments, as a point at which two edges of the building footprint meet. This definition is relevant to embodiments involving polygonal building footprints (such as in FIGS. 4*b*, 5*b* and 8*a*-8*d*) and embodiments involving non-polygonal building footprints which nevertheless include two edges meeting at a point which causes a start/end point of a shadow (such as in FIG. 9*b*).

Vertices are defined differently for building footprints having one or more curved edges which causes a start/end point of a shadow (such as in FIGS. 9*a*-9*d*). In these embodiments, at least one of the first vertex and the second vertex is a point at which the building footprint and an end of a chord of the building footprint meet, the chord being orientated to maximise the component of the chord in a direction that is perpendicular to the direction of the light source (where the direction of the light source should be understood to be the direction of incoming light rays from the light source). This chord can be considered to show the 'widest' extent of the building from the point of view of the light source. The two points at either end of the chord can be considered to be the 'widest' points of the building, from the point of view of the light source.

Conventionally, a chord is a straight line joining two points on a curve (e.g. on a circle, an arc, an ellipse). In some embodiments of the present disclosure, at least one of the two points on the curve (that are joined by the chord) can be an end point of the curve (as in FIG. 9*b*). In some embodiments of the present disclosure, a chord can be considered to be a straight line joining two points on a partially-curved, partially straight-edged line of the building footprint (as in FIG. 9*b*). In some embodiments of the present disclosure, the chord can join two points on a curve (or two points on different curves) of the building footprint, whilst also crossing the curve and/or another line(s) or curve(s) of the building footprint at additional intermediary locations (as in FIG. 9*c*). Curve-type vertices are described further below for circular (FIG. 9*a*) and partially curved, partially straight-edged (FIGS. 9*b*-9*c*) building footprints.

It will be appreciated that in some embodiments (such as FIG. 9*b*), both definitions of vertex can be relevant. A partially curved and partially straight-edged canopy footprint could, depending on the shape of the canopy footprint and the position of the light source, have a shadow starting and ending at (or proximate to) two polygonal-type vertices, two curve-type vertices or one of each.

Curve-type vertices of a building footprint may be identified using various methods. For example, curve-type vertices may be identified using the location of the Sun relative to the building footprint at the time the overhead image was captured. This relative location (e.g. due west, a heading of 112°) defines the direction of incoming light rays from the Sun, and therefore it can be used to determine the chord that has the largest possible component in a direction perpendicular to the direction of the light source (i.e. the chord representing the widest extent of the building from the point of view of the light source). The points at which the determined chord meets the building footprint defines the curve-type-vertices. One method of identifying the location of the Sun relative to the building footprint at the time the overhead image was captured is to combine (i) a date and time stamp associated with the overhead image and (ii) information about the location of the Sun at various dates and times, but other methods are possible and within the scope of the present disclosure. As for the earlier-mentioned step of identifying one or more vertices of the building footprint, the actual performance of this step is not required by the present disclosure, although in some embodiments it may be performed in combination with methods 600 and 610.

FIG. 9*a* shows a circular non-canopy building footprint 910*a*, a shadow 930*a* cast by the building, two vertex points 920*a* and 925*a* of the building footprint 910*a*, start point 940*a* and end point 945*a* of the shadow 930*a*, a light source (the Sun), two parallel light rays just passing either side of the building, a chord 960*a* (dotted line), and the component 965*a* of the chord in the direction perpendicular to the direction of the light source. In FIG. 9*a*, the chord 960*a* is a diameter of the circular building footprint. The chord 960*a* is perpendicular to the direction of the light source (although this is not always the case, as shown by the chords 960*b*, 960*c* in FIGS. 9*b* and 9*c*). This orientation of the chord 960*a* maximises the component 965*a* of the chord in the direction perpendicular to the direction of the light source. The shadow 930*a* is discussed further below with reference to the shadow in FIG. 9*d*.

FIG. 9*b* shows a partially curved, partially straight-edged canopy footprint 910*b* formed of one curved edge 912*b* and one straight edge 918*b*. FIG. 9*b* also shows a polygonal-type vertex 925*b*, a curve-type vertex 970*b*, a light source, two parallel light rays passing either side of the building, a chord 960*b* (dotted line), and the component 965*b* of the chord in the direction perpendicular to the direction of the light source. A shadow cast by the canopy is not shown to avoid overcrowding the figure.

In FIG. 9*b*, the polygonal-type vertex 925*b* is defined as a point at which the curved edge 912*b* and the straight edge 918*b* of the canopy footprint meet. The curve-type vertex 970*b* is defined as a point at which an end of the chord 960*b* and the canopy footprint 910*b* meet. The chord 960*b* extends between a point on the curved edge 912*b* of the canopy footprint and a point where the curved edge 912*b* and straight edge 918*b* meet, with the point on the curved edge 912*b* being the curve-type vertex 970*b*. The chord 960*b* is not perpendicular to the direction of the light source (unlike in FIG. 9*a*); instead, its orientation maximises the component 965*b* of the chord 960*b* in the direction perpendicular to the direction of the light source. It will be appreciated that in this embodiment (and some other embodiments), the two ends of the chord actually correspond to and define both vertices, not only the curve-type vertex.

FIG. 9*c* shows a partially curved, partially straight-edged canopy footprint 910*d* formed of two curved edges and two straight edges. FIG. 9*c* also shows two curve-type vertices 970*c*, 975*c*, a light source, two parallel light rays passing either side of the building, a chord 960*c* (dotted line), and the component 965*c* of the chord 960*c* in the direction perpendicular to the direction of the light source. A shadow cast by the canopy is not shown to avoid overcrowding the figure.

As in previous embodiments, the chord 960*c* in FIG. 9*c* is orientated to maximise the component 965*c* of the chord 960*c* in the direction perpendicular to the direction of the light source, i.e. to represent the 'widest' extent of the building from the point of view of the light source, or to join the two 'widest' points of the building from the point of view of the light source. In FIG. 9*c*, the chord 960*c* joins two points on a curve of the building footprint, whilst also crossing another curve/line of the building footprint at intermediary locations.

FIGS. 9*a* and 9*d* illustrate how a canopy with one or more curved edges may be identified using its building footprint and shadow. FIG. 9*a* shows a circular non-canopy building footprint 910*a* and a shadow 930*a* cast by the building. As the building for FIG. 9*a* is not a canopy, there are no substantially open sides of the building and so the one (circular) side of the building can be considered to be closed. Thus, when a shadow 930*a* is cast by the building, the start and end points 940*a*, 945*a* of the shadow 930*a* are coincident with the vertex points 920*a*, 925*a*.

FIG. 9*d* is similar to FIG. 9*a* but for a canopy instead of a non-canopy building. FIG. 9*d* shows a circular canopy footprint 910*d*, a chord 960*d* (dotted line), a shadow 930*d* cast by the canopy due to the same light source as in FIG. 9*a*, two vertex points 920*d* and 925*d* of the canopy footprint 910*d*, start point 940*d* and end point 945*d* of the shadow 930*d* and the light source. As the building casting the shadow 930*d* is a canopy, the start point 940*d* and end point 945*d* of the shadow are not coincident with the vertex points 920*d*, 925*d* of the canopy footprint 910*d*. Instead, the start and end points 940*d*, 945*d* are offset from the vertex points 920*d*, 925*d*. These offsets can be compared to an offset to determine that the building footprint 910*d* represents a canopy, in accordance with the method 600 or 610.

The start point of the shadow and the end point of the shadow may be identified using various methods. For example, the shadow may be manually inspected to identify the start and end point. The overhead image of the building (from which the shadow was identified) may be combined with street-level imagery of the building to automatically determine the start point and end point of the shadow. As for the earlier-mentioned step of identifying the start and end point of the shadow, the actual performance of this step is not required by the present disclosure, although in some embodiments it may be performed in combination with methods 600 and 611.

Apparatus Performing the Methods Herein

FIGS. 1 and 2 show a system and apparatus respectively which may, in some embodiments, perform methods described herein (including but not limited to method 600). FIG. 1 shows a map developer system; however, the methods disclosed herein could be performed by various other entities, for example a governmental agency or an urban planning company may be interested in identifying the locations of canopy buildings.

In some embodiments, a system comprising multiple apparatus could perform the methods disclosed herein, with different steps of the methods being performed by different apparatus. For example, one apparatus could compare the first and second offsets to an offset threshold, and send the output of the comparison to a second apparatus; the second apparatus could interpret the received output to determine that the building footprint represents a canopy. Different apparatuses could identify the shadow from the overhead image, identify a start point and end point of the shadow, calculate the first and second offsets, and update the geographic database to indicate that the building is a canopy.

FIG. 1 shows a system including a map developer system 116, comprising a map database 108 and a processing server 102, in communication with one or more mobile devices 114 via a network 112. The network may be wired, wireless, or any combination of wired and wireless communication networks, such as cellular, Wi-Fi, internet, local area networks, or the like. Additional, different, or fewer components may be provided. For example, the map developer system 116 may be in communication with many mobile devices 114 via the network 112.

The mobile device 114 may include a portable computing device such as a laptop computer, tablet computer, mobile phone, smart phone, portable navigation device, personal data assistant (PDA), wearable electronic device, camera, portable navigation device, or the like. Additionally or alternatively, the user equipment 104 may be a fixed computing device, such as a personal computer, computer workstation, kiosk, office terminal computer or system, or the like.

The processing server 102 may be one or more fixed or mobile computing devices. The mobile device 114 may be configured to access the map database 108 via network 112 and via the processing server 102 through, for example, a mapping application, such that the mobile device 114 may provide navigational assistance to a user through access to the map developer system 116.

The map database 108 may include road segment data records (or equivalently 'link data'), node data records, and/or point of interest (POI) data records. The road segment data records may be segments or links representing roads, streets, or paths. The node data records may represent intersections between roads, streets or paths. In some embodiments, the road link data and the node data may represent a road network, such as used by vehicles, cars, trucks, buses, motorcycles, bicycles and/or other entities. The map database 108 may also include cartographic data, routing data, maneuvering data and/or other types of data.

The map database 108 may include data regarding buildings on or around the road network, for example in building data records. A building data record may include information about the location and extent of the building (e.g. coordinates for each corner of the building), the type of building, and/or a building footprint. The map database may include information about whether a building is a canopy or not a canopy.

The map database 108 may be maintained by a content provider e.g., a map developer. In some embodiments, the map developer may collect geographic data to generate and enhance the map database 108, whereas in other embodiments, the map database 108 may delegate map generation and revision to other devices, such as mobile device 114. The map developer can use different ways to collect data. One such way includes obtaining data from other sources, such as municipality authorities. Another way is for the map developer to employ field personnel to travel by vehicle along roads throughout the geographic region to observe features and/or record information about them. Another way is using remote sensing, such as aerial or satellite photography, to generate map geometries directly or through machine learning. As discussed extensively above, aerial or satellite images can be used to identify canopy buildings for inclusion in the map database 108.

FIG. 2 shows one embodiment of an apparatus 200 which may be configured to perform methods described herein. The apparatus 200 includes or is otherwise in communication with a processor 202, a memory device 204, a communication interface 206, and a user interface 208. In this example only one processor 202 and one memory device 204 are shown but it will be appreciated that other examples may utilise more than one processor and/or more than one memory devices (e.g. same or different processor/memory types).

In some embodiments, apparatus 200 may be an example of processing server 102 as shown in FIG. 1. In some embodiments, apparatus 200 may be an example of mobile device 114 as shown in FIG. 1. In other embodiments, apparatus 200 may be a module for a device or circuitry for a device (e.g. processing server 102 or mobile device 114).

The processor 202 (and/or co-processors or any other processing circuitry assisting or otherwise associated with the processor) is in communication with the memory device 204 via a bus for passing information among components of the apparatus 200. The internal connections between the memory device 204 and the processor 202 can be understood to provide active coupling between the processor 202 and the memory device 204 to allow the processor 202 to access computer program code stored on the memory device 204.

The memory device 204 may be non-transitory and may include, for example, one or more volatile and/or non-volatile memories. In other words, for example, the memory device 204 may be an electronic storage device (e.g. a computer-readable storage medium) comprising gates configured to store data (for example, bits) that may be retrievable by a machine (e.g. a computing device like the processor 202). The memory device 204 may be solid-state memory, a hard disk drive (HDD), read-only memory (ROM), random-access memory (ROM), flash memory or another type of memory. The memory device 204 may be configured to store information, data, content, applications, instructions or the like executable by processor 202 for enabling the apparatus to carry out various functions in accordance with an example embodiment of the present disclosure. For example, the memory device 204 could be configured to buffer input data for processing by the processor 202. Additionally or alternatively, the memory device 204 could be configured to store instructions for execution by the processor 202. For example, memory device 204 may be configured to store computer program instructions which, when executed by processor 202, cause apparatus 200 to perform a method as described herein.

The processor 202 may be embodied in a number of different ways. For example, the processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an application specific integrated circuit (ASIC), a field programmable gate array (FGPA), a microcontroller unit (MCU), a hardware accelerator, a special-purpose computer chip, or the like. As such, in some embodiments, the processor may include one or more processing cores (of the same or different types) configured to perform independently. A multi-core processor may enable multiprocessing within a single physical package. Additionally or alternatively, the processor 202 may include one or more processors configured in tandem via the bus to enable independent execution of instructions, pipelining and/or multithreading.

In some embodiments, the processor 202 may be configured to execute instructions stored in the memory device 204 or otherwise accessible to the processor 202. Alternatively or additionally, the processor 202 may be configured to execute hard coded functionality. As such, whether configured by hardware or software methods, or by a combination thereof, the processor 202 may represent an entity (for example, physically embodied in circuitry) capable of performing operations according to an embodiment of the present disclosure while configured accordingly. Thus, for example, when the processor 202 is embodied as an ASIC, FPGA or the like, the processor may be specifically configured hardware for conducting the operations described herein. Alternatively, as another example, when the processor 202 is embodied as an executor of software instructions, the instructions may specifically configure the processor 202 to perform the algorithms and/or operations described herein when the instructions are executed. However, in some cases, the processor 202 may be a processor specific device (for example, a mobile terminal or a fixed computing device) configured to employ an embodiment of the present disclosure by further configuration of the processor by instructions for performing the algorithms and/or operations described herein. The processor 202 may include, among other things, a clock, an arithmetic logic unit (ALU) and logic gates configured to support operation of the processor.

The apparatus 200 may also include a communication interface 206. Communication interface 206 may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include an optional user interface 208 that maybe in communication with the processor 202 to provide output to the user and, in some embodiments, to receive an indication of a user input. As such, the user interface 208 may include a display and, in some embodiments, may also include a keyboard, a mouse, a joystick, a touch screen, touch areas, soft keys, one or more microphones, a plurality of speakers, or other input/output mechanisms. In one embodiment, the processor 202 may comprise user interface circuitry configured to control at least some functions of one or more user interface elements such as a display and, in some embodiments, a plurality of speakers, a ringer, one or more microphones and/or the like. The processor 202 and/or user interface circuitry comprising the processor may be configured to control one or more functions of one or more user interface elements through computer program instructions (for example, software and/or firmware) stored on a memory accessible to the processor 202 (for example, memory device 204, and/or the like). The processor 202 may receive data via the user interface 208 and/or the communications interface 206 and memory device 204 may be configured to store data received via the user interface 208 and/or the communication interface 206.

Figure 10:
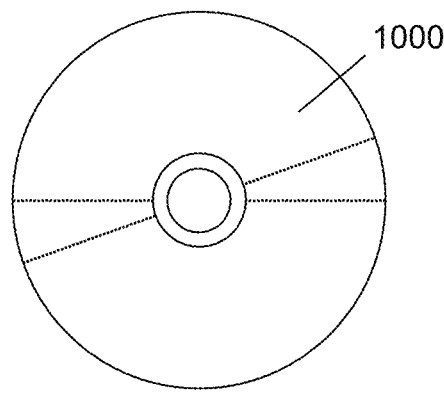
FIG. 10 shows schematically an example computer-readable medium comprising a computer program configured to perform, control or enable the method of FIG. 6a or FIG. 6b.

FIG. 10 shows an example computer-readable medium 1000 comprising a computer program configured to perform, control or enable the method of FIG. 6 or any other method described herein. The computer program may comprise computer code configured to perform the method(s). In this example, the computer/processor readable medium 1000 is a disc such as a digital versatile disc (DVD) or a compact disc (CD). In other examples, the computer/processor readable medium 1000 may be any medium that has been programmed in such a way as to carry out an inventive function. The computer/processor readable medium 1000 may be a removable memory device such as a memory stick or memory card (SD, mini SD, micro SD or nano SD card). In some embodiments, the computer-readable medium 1000 may be non-transitory.

It will be appreciated to the skilled reader that any mentioned apparatus/device and/or other features of particular mentioned apparatus/device may be provided by apparatus arranged such that they become configured to carry out the desired operations when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus/device may be pre-programmed with the appropriate software to carry out desired operations, and wherein the appropriate software can be enabled for use by a user downloading a "key", for example, to unlock/enable the software and its associated functionality Such examples can allow a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc.), these may comprise a computer processor, Application Specific Integrated Circuit (ASIC), field-programmable gate array (FPGA), and/or other hardware components that have been programmed in such a way to carry out the inventive function.

It will be appreciated that the term "circuitry" may refer to one or more or all of the following: (a) hardware-only circuit implementations (such as implementations in only analogue and/or digital circuitry) and (b) combinations of hardware circuits and software, such as (as applicable): (i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as a microprocessor(s) or a portion of a microprocessor(s), that requires software (e.g. firmware) for operation, but the software may not be present when it is not needed for operation.

This definition of circuitry applies to all uses of this term in this application, including in the claims. As a further example, as used in this application the term circuitry also covers and implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although the foregoing description and the associated drawings describe example embodiments including certain example combinations of features, it should be appreciated that different combinations of features may be provided by alternative embodiments without departing from the scope of the appended claims. In this regard, the applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims.

In view of the foregoing description it will be evident to a person skilled in the art that various modifications may be made within the scope of the disclosure. Therefore, it is to be understood that the disclosure is not to be limited to the specific embodiments described above and that modifications and other embodiments are intended to be included within the scope of the appended claims. It will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or example may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A computer-implemented method comprising:
receiving a first calculated offset distance corresponding to a measurement between a start point of a shadow cast by a building and a proximate first vertex of a building footprint of the building,
receiving a second calculated offset distance corresponding to a measurement between an end point of the shadow cast by the building and a proximate second vertex of the building footprint, the shadow having been identified from an overhead image of the building, and wherein the building footprint comprises a shadowed side and a non-shadowed side, each running between the start point and the end point of the shadow on a different respective side of the building;
comparing the first and second received offsets to an offset threshold corresponding to distance values; and
in response to both the first and second received offsets exceeding the offset threshold, determining that the building footprint represents a canopy, wherein the canopy comprises at least one of a free-standing roof structure which has at least one open side between the roof and the ground, and a free-standing roof structure which has all sides open.

2. The method of claim 1, wherein the offset threshold corresponds to at least one or more of 0.25 meters, 0.5 meters, 1 meter, 1.5 meters, 2 meters or 2.5 meters at a real-world scale.
3. The method of claim 1, wherein the offset threshold is a fraction of a length of an edge of the building footprint along which the first calculated offset occurs.
4. The method of claim 1, wherein the overhead image of the building is a satellite image.
5. The method of claim 1, wherein the overhead image of the building is an image captured by an aerial vehicle.
6. The method of claim 1, further comprising:
identifying the shadow from the overhead image of the building.
7. The method of claim 1, further comprising:
identifying the start point of the shadow and the end point of the shadow.
8. The method of claim 7, wherein identifying the start point and end point of the shadow comprises identifying the start point and end point from more than two candidate start/end points.
9. The method of claim 1, further comprising:
for each of the start point and end point of the shadow, identifying a proximate first vertex of the building footprint.
10. The method of claim 1, further comprising:
calculating the first offset between the start point of the shadow cast by a building and the proximate first vertex of the building footprint; and
calculating the second offset between the end point of the shadow cast by the building and the proximate second vertex of the building footprint.
11. The method of claim 10, further comprising:
aligning the building footprint and the shadow prior to calculating the first and second offsets.
12. The method of claim 10, wherein the building footprint is stored in a building layer of a geographic database.
13. The method of claim 1, wherein the shadow is a continuous shadow with no breaks in the shadow between the start point and end point.
14. The method of claim 1, wherein the shadow is a discontinuous shadow comprising two or more shadow portions with one or more non-shadowed portions in between on the shadowed side of the building footprint.
15. The method of claim 1, wherein a vertex of the building footprint is a point at which two edges of the building footprint meet.
16. The method of claim 1, wherein at least one of the first vertex and second vertex of the building footprint is a point at which the building footprint and an end of a chord of the building footprint meet, wherein the chord represents the widest extent of the building from the point of view of a light source, the chord being orientated to maximise the component of the chord in a direction that is perpendicular to a direction of the light source.
17. The method of claim 1, further comprising:
updating a geographic database to indicate that the building is the canopy.
18. The method of claim 1, further comprising:
in response to both the first and second received offsets exceeding the offset threshold, determining that the building footprint represents a full canopy, wherein the full canopy corresponds to a free-standing roof structure which has all sides open.
19. An apparatus comprising:
at least one processor; and
at least one memory including computer program code;

the at least one memory and the computer program code configured to, with the at least one processor, cause the apparatus to:

receive a first calculated offset distance corresponding to a measurement between a start point of a shadow cast by a building and a proximate first vertex of a building footprint of the building, receive a second calculated offset distance corresponding to a measurement between an end point of the shadow cast by the building and a proximate second vertex of the building footprint, the shadow having been identified from an overhead image of the building, and wherein the building footprint comprises a shadowed side and a non-shadowed side, each running between the start point and the end point of the shadow on a different respective side of the building;

compare the first and second received offsets to an offset threshold corresponding to distance values; and in response to both the first and second received offsets exceeding the offset threshold, determine that the building footprint represents a canopy, wherein the canopy comprises at least one of a free-standing roof structure which has at least one open side between the roof and the ground, and a free-standing roof structure which has all sides open.

20. A non-transitory computer-readable medium comprising computer-readable instructions which, when executed on an apparatus, cause the apparatus to:

receive a first calculated offset distance corresponding to a measurement between a start point of a shadow cast by a building and a proximate first vertex of a building footprint of the building, receive a second calculated offset distance corresponding to a measurement between an end point of the shadow cast by the building and a proximate second vertex of the building footprint, the shadow having been identified from an overhead image of the building, and wherein the building footprint comprises a shadowed side and a non-shadowed side, each running between the start point and the end point of the shadow on a different respective side of the building;

compare the first and second received offsets to an offset threshold corresponding to distance values; and in response to both the first and second received offsets exceeding the offset threshold, determine that the building footprint represents a canopy, wherein the canopy comprises at least one of a free-standing roof structure which has at least one open side between the roof and the ground, and a free-standing roof structure which has all sides open.

* * * * *